Nov. 3, 1970     D. P. KECKLER ETAL     3,537,965

PROCESS FOR THE PRODUCTION OF UNSATURATED HYDROCARBONS

Filed June 16, 1969

INVENTORS
DAVID P. KECKLER
JOHN EDWARD LOEFFLER, JR.
BY John J. Freer

United States Patent Office 3,537,965
Patented Nov. 3, 1970

3,537,965
PROCESS FOR THE PRODUCTION OF UNSATURATED HYDROCARBONS
David P. Keckler, La Porte, and John Edward Loeffler, Jr., Houston, Tex., assignors to Diamond Shamrock Corporation, Cleveland, Ohio, a corporation of Delaware
Continuation-in-part of application Ser. No. 542,682, Apr. 14, 1966. This application June 16, 1969, Ser. No. 853,231
Int. Cl. C07c 3/48
U.S. Cl. 204—171
4 Claims

ABSTRACT OF THE DISCLOSURE

In the preparation of unsaturated hydrocarbons in an electric arc reactor from a hydrocarbon feed, reactant gas enters and flows within electrode elements having opposed entrances and exits downstream therefrom. The arc discharge pattern penetrates through the electrodes; and, within the passage of at least one electrode element diluent gas at essentially ambient temperature is bled along a portion of such passage to form a sheath of diluent gas around the balance of the gas within the passage thereby enhancing unsaturated hydrocarbon production while reducing power requirements.

CROSS REFERENCE TO RELATED APPLICATIONS

This application is a continuation-in-part of application Ser. No. 542,682, filed Apr. 14, 1966, and now abandoned.

BACKGROUND OF THE INVENTION

An arc reactor, or arc "generator" as it may also be referred to herein, of the plasma type is one as shown in U.S. Pat. 3,400,070 wherein, in essence, gaseous materials are introduced in a channeled reaction chamber near the center of the arc and flow away from the central region through a pair of hollow electrodes, spaced apart, where the hollow electrode passages form the reaction chamber. In operation, as in the preparation of unsaturated hydrocarbons from more saturated hydrocarbons and where arc stability is usually not promoted by magnetic fields, such reactor can exhibit arc stability problems and, correspondingly, diminished utilization of the energy input into the arc. Also, within the region of the reaction chamber, reactant gas flowing along the walls of such region can be out of contact with the electrical energy of the arc thus remaining virtually unreacted and in cool condition, which cooling can be augmented by the walls of the electrode passage.

SUMMARY OF THE INVENTION

The present invention offers enhanced product production, i.e., enhanced production of unsaturated hydrocarbons from more saturated hydrocarbons while reducing power requirements of such a reactor. Thus, by the process of the present invention the problems encountered heretofore with respect to utilization and energy input including arc stabilization have been successfully overcome.

Broadly, the present invention is an improved process for producing unsaturated hydrocarbons from more saturated hydrocarbons by utilizing such a reactor, which improved process comprises feeding a reactant gas containing saturated hydrocarbons having one to eight carbon atoms into the passages within the electrode elements through the entrances thereof; establishing an arc at least substantially within such passages and having an energy content, basis 100 cu. ft. (N.T.P.) of said reactant gas per hour, within the range of 9–13 kw.; and bleeding at substantially ambient temperature a diluent gas for passage along at least a portion of a throat of such passages in a direction towards the exit of the electrode passage and in an amount sufficient to provide a volume ratio of diluent gas to reactant hydrocarbons, basis total gaseous feed to the throat, of below about 3:1. Thus, diluent gas flows downstream from the reactant gas feeding into the throat entrances, and substantially along the walls of such throat, forming a sheath of diluent gas around the balance of the gas in the throat.

DESCRIPTION OF THE PREFERRED EMBODIMENTS

Figure 1:
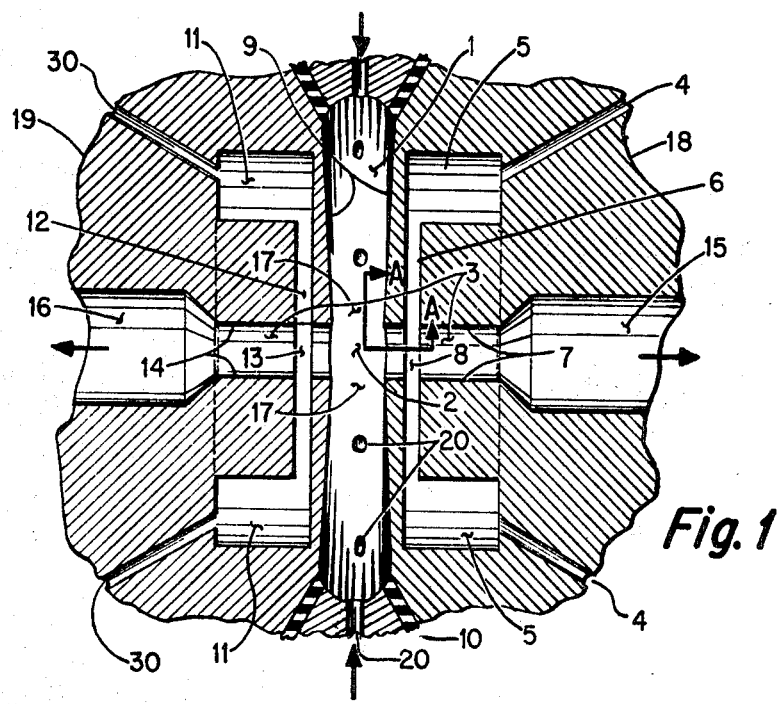
FIG. 1 is a vertical cross-sectional view of one embodiment of a high temperature electric arc plasma reactor for practicing the process of the present invention.

Referring to FIG. 1, a generally tubular reactor housing, not shown, but of the type shown in U.S. Pat. 3,400,070, and having appropriate insulation 10, shown in part, along with power supply, cooling, and quenching apparatus, not shown, houses a pair of electrode elements 18 and 19 each forming a passage comprising a throat region 3, for at least in part containing an arc discharge pattern penetrating therethrough. A primary nozzle assembly has feed inlets 20 leading from a primary gas source, not shown, to a disk-shaped primary gas chamber 1 which connects with a cylindrical gas introduction port 17. With insulation 10, the primary gas chamber 1 separates the pair of electrodes 18 and 19. The gas introduction port 17 opens into a central chamber zone 2 and the primary gas chamber 1 is positioned essentially perpendicularly to the plane of the throat region 3. The central chamber zone 2 is situated at substantially the middle zone of the throat region 3, while the throats 3 neck outwardly permitting consequent gas expansion within the electrode passages, in connection with elongated essentially tubuar diffuser regions 15 and 16, also termed herein as gas discharge passages, one at each end of the throat region 3.

A diluent gas introduction assembly, or as sometimes referred to herein as a "secondary" gas assembly, has a source, not shown, connected by feed lines 4 and 30 to a pair of plenum chambers 5 and 11 which are spaced apart from one another across the primary gas chamber 1. Each plenum chamber 5 and 11 defines a continuous hollow zone, which can be torus-shaped, and which is located in concentric relationship around the throat region 3. The first plenum chamber 5 has an annularly-shaped chamber outlet 6 leading to a cylindrical gas introduction port 8. This port 8 is located downstream from the central chamber zone 2 within a first wall portion 7 of the electrical discharge zone 3 and is in a plane substantially parallel to the primary gas chamber 1. The second plenum chamber 11 also connects, by an annularly-shaped chamber outlet 12 to a cylindrical secondary gas introduction port 13 maintained within a second wall portion 14 of the electrical discharge zone 3. This second wall portion 14 is spaced across the central chamber zone 2 from the first wall portion 7, and is also in a plane substantially parallel to the primary gas chamber 1.

Although the reactor zone defined by the throat region 3 and gas discharge passages 15 and 16, is depicted in FIG. 1 as necking outwardly to form expanded gas diffuser regions 15 and 16, the reactor zone can neck inwardly or be a passage of essentially constant diameter. Moreover, the throat region 3 can have, in cross section, a circular, or rectangular or other polygonal shape, and the wall portions 7 and 14 of these zones 3 can be beveled for gradual compression or expansion of gas. Although the walls 9 of the primary gas chamber 1 are beveled to compress gas flowing towards the central chamber zone 2, these walls 9 can be essentially perpendicular to the throat regions 3 or beveled for gradual gas expansion. Also, the secondary gas introduction ports 8 and 13 can be a series of orifices around a portion of the zones 3, and the primary gas chamber 1 can be positioned in a plane other than one which is perpendicular to these zones 3. The primary gas feed inlets 20 can be disposed around the perimeter of the primary gas chamber 1 for feeding gas radially, tangentially, or otherwise into such chamber 1, and/or can be disposed for feeding gas from ports contained within the walls 9 of the chamber 1. Moreover, such inlets 20 can be one or more slots or vented ports such as the gas introduction port 8 of FIG. 3.

Figure 2:
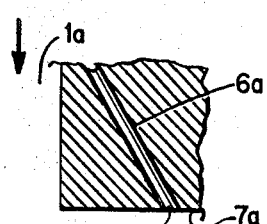
FIGS. 2–5 are cross-sectional views of the reactor of FIG. 1 showing different embodiments for such reactor and taken along the line A—A of FIG. 1.
Figure 3:
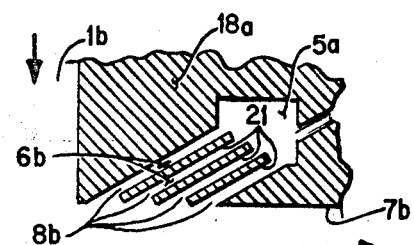

Variations in the secondary gas introduction ports of FIG. 1 are shown in FIGS. 2, 3, 4, and 5. FIG. 2 depicts a chamber outlet 6a in a plane positioned at an angle to the primary gas chamber 1a. This outlet leads to a gas introduction port 8a located within the first wall portion 7a of the electrical discharge zone. FIG. 3 shows a series of chamber outlets 6b positioned in a plane angled to the plane of the primary gas chamber 1b, which outlets 6b are separated by a sequence of frustum-shaped conical vanes 21 around the electrical discharge zone. These outlets 6b connect from a plenum chamber 5a through a series of secondary gas introduction ports 8b to the first wall portion 7b of the electrical discharge zone. The vanes 21 can be maintained rigidly in place and rigidly affixed to the reactor electrode 18a by any conventional fastening means, e.g., ribs between the vanes 21, which are welded to the vanes 21.

Figure 4:
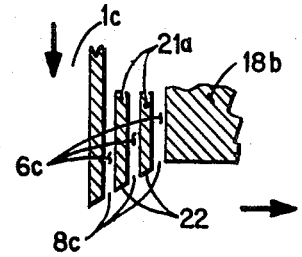
Figure 5:
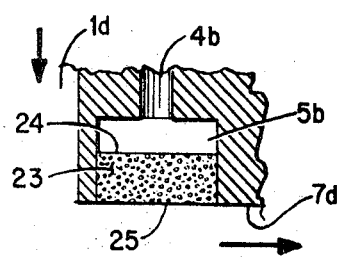
Figure 6:
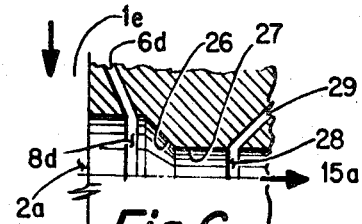

FIG. 4 shows a succession of chamber outlets 6c positioned in a plane substantially parallel to the plane of the primary gas chamber 1c with the outlets 6c being separated by a series of annularly-shaped vanes 21a. The chamber outlets 6c connect with a series of secondary gas introduction ports 8c at an outwardly necked wall portion 22 of the throat regions. The vanes 21a can be kept rigidly in place spaced apart from one another and rigidly fastened to the reactor electrode 18b by any conventional fastening means. FIG. 5 depicts a porous cylindrical sleeve 23 having a porous exterior surface 24 facing a plenum chamber 5b connected to a secondary gas source, not shown, by a feed line 4b. The porous interior surface 25 of the sleeve 23 forms a part of the first wall portion 7d of the throat regions. In operation, secondary gas permeates into the porous sleeve 23 from the plenum chamber 5b, then discharges along the porous interior sleeve surface 25, and subsequently bleeds along the wall portion 7d of the throat zones.

In one method of carrying out the invention of the apparatus shown in FIG. 1, diluent gas is first fed through feed inlets 20 to the primary gas chamber 1, then into the central chamber zone 2 and from there flows along the throat regions 3. Thereafter an arc is established between the electrodes 18 and 19 by passing an arc forming electric current within the region 3. The reactant gas is mixed with the diluent gas and thereby diluted for enhanced control of the reaction temperature, and this blend is fed through feed inlets 20 to the primary gas chamber 1 and from there into the central chamber zone 2, and subsequently flows along the throat regions 3, primarily for molecular decomposition.

Diluent gas issues through the chamber outlet 6 from the first plenum chamber 5. This diluent gas bleeds through the secondary gas introduction port 8 and flows along the first wall portion 7 of the throat region 3, thus forming a sheath of diluent gas around the reactant gas within such region 3 and subsequently around the expanded gaseous effluent within the gaseous discharge passage 15. Simultaneously, diluent gas issues through the chamber outlet 12 from the second plenum chamber 11. This diluent gas bleeds through the secondary gas introduction port 13 and flows along the second wall portion 14 of the throat zone 3, thus forming a sheath of gas around the reactant gas within such zone 3 and subsequently around the expanded gaseous effluent within the gas discharge passage 16.

This diluent gas sweeping along the cooler wall portions 7 and 14 of the throat zone 3 concentrates the reactant gas near the source of the electrical energy, thus narrowing the temperature range within which the reactant gas is maintained during passage through this zone 3 and enhancing energy utilization within the reactor. Additionally, such concentrating of reactant gas can promote arc stability.

With hollow electrodes, the cathodic or anodic strike points of the arc generally move radially around the passages within the electrodes because of the natural turbulence of the gas. Additionally these strike points are free to move back and forth along the length of the chamber under the influence of gas turbulence. Thus, it is to be understood that the "electrical discharge zone" which contains the arc strike points, as the term is used herein, refers to a zone which can have continuously changing boundaries. Therefore the region of the electrical discharge blends from the throat region into the gas diffuser region rather than having a fixed termination point. For convenience this combination of the throat region and subsequent gas diffuser region is referred to herein as the "reactor zone," or the "passages" of the electrode elements.

Suitable hydrocarbon feed materials which may be employed can be saturated or unsaturated hydrocarbons and aromatics containing up to 8 or more carbon atoms. Exemplary of saturated hydrocarbons include methane, ethane, propane, isopropane, butane, isobutane, pentane, etc.; exemplary of suitable unsaturated hydrocarbons include ethylene, the propylenes; the butylenes, etc.; exemplary of suitable aromatics include benzene, toluene and the xylenes. The preferred hydrocarbon feed materials are the saturated aliphatic hydrocarbons containing 1 to 4 carbon atoms with methane being the especially preferred feed material. The hydrocarbon feed, e.g., methane employed does not need to be pure; for instance, commercial sources of methane, e.g., from natural gas and off-gases, containing small amounts of other hydrocarbons may be employed. The concentration of unsaturated hydrocarbon product, e.g., acetylene, based on conversion of the feed will vary with the amount of diluent gas, preferably hydrogen, employed.

Essentially non-reactant or nonoxidizing gases, i.e., diluent gases useful for sustaining the arc or as diluents in maintaining temperature control but which do not directly react for the production of unsaturated hydrocarbons, are typically such gases as are readily commercially available and include argon, helium, nitrogen, hydrogen, or recycle gas from downstream acetylene purification equipment, or mixtures thereof.

The volume ratio of the diluent gas to the reactant gas should not be above about 3:1 as greater ratios retard the economical operation of downstream unsaturated hydrocarbon purification equipment. Advantageously, for enhanced economy the ratio of diluent gas to reactant gas is below about 1.5:1 and preferably is about 1:1 or lower. Furthermore, although reactors can be operated at subatmospheric pressures, e.g., 0.1 atmosphere, or atmospheric or greater than atmospheric pressure such as up to about 20 atmospheres, for efficiency the reactor zone is preferably maintained at a pressure between about 1.5 and about 10 atmospheres.

Whn the arc is established it should have an energy content, based on 100 cu. ft. (N.T.P.) of reactant gas per hour, within the range of 9–13 kilowatts. An energy content on such a basis of less than about 9 kilowatts may be insufficient for efficient conversion of reactant gas to unsaturated hydrocarbons while an energy content of greater than about 13 kilowatts can supply a deleteriously high heat content for the reaction gases, i.e., may lead to undesirable decomposition of unsaturated gaseous product. Preferably, for enhanced conversion without undesirable gaseous product decomposition, the arc supplies an energy content on the above mentioned basis of between about 10–13 kilowatts.

The following example further illustrates the practice of this invention but should not be construed as limiting the invention. In the example, apparatus similar to that shown in FIG. 1 is used for the production of acetylene by cracking methane.

EXAMPLE

The throat regions in the reactor, e.g., the passage 3 in FIG. 1, has a diameter of ¼ in. and a length of 1¼ in. for the constant diameter section between the outwardly necking sections of the passage. The reactor is operated at a power level maintained at 425 kilowatts. The reactor is water cooled and water spray is employed for quenching; beyond the quenching area reactor pressure is measured at 45 p.s.i.g. for both modes of operation, as discussed hereinbelow.

The gases employed, by volume, are 4500 cubic feet of hydrogen analyzing at 99.9 volume percent of hydrogen, and 4500 cubic feet of natural gas analyzing, in percent by volume, at 83.5% $CH_4$, 12.5% $C_2H_6$, 0.2% $CO_2$ and the balance $N_2$. These gases entered the reactor at room temperature, i.e., without being preheated.

At the initiation of the experiment the reactor is operated in a first mode of operation, i.e., 3600 cubic feet of hydrogen are added to sweep along the walls of the reactor zone, e.g., through the introduction ports 8 and 13 of FIG. 1, to provide a sheath of hydrogen around the natural gas which is simultaneously added to the reactor zone to form an essentially natural gas plasma. Thereafter, the reactor is operated according to a second mode of operation, i.e., the balance of the hydrogen is premixed with the balance of the natural gas, the initial hydrogen inlets are closed, and the resulting premixed gas is added to the reactor zone where only the natural gas was previously added, e.g., at the primary gas introduction port 17 in FIG. 1, forming a conventional hydrogen-natural gas plasma. For both modes of operation, i.e., prior to premixing of gases and after premixing of gases, the reaction time prior to quenching was about 0.00035 second.

Analysis of the product gas leaving the quenching area provided the following data:

|  | Natural gas feed; $H_2$ added along reactor wall | Premixed $H_2$-natural gas feed |
|---|---|---|
| Percent of carbon in feed gas molecules converted to $C_2H_2$ | 65 | 50 |
| Power requirement, in kilowatt hours, per lb. $C_2H_2$ produced | 4.7–4.8 | 5.6 |

As is seen from the above data, sheathing the natural gas in hydrogen, as compared with using a conventional hydrogen-natural gas plasma, results in enhanced conversion of feed to the desired acetylene and excellent decrease in the power required to produce the acetylene.

The foregoing description is for purposes of illustration and not of limitation and it is therefore intended that the invention be limited only by the appended claims.

What is claimed:
1. In a process for producing unsaturated hydrocarbons from more saturated hydrocarbons in a process wherein gas flows through electrode elements each forming a passage for containing an arc discharge pattern penetrating therethrough, said passages having opposed entrances and exits downstream therefrom, with the passage of at least one element including a relatively reduced cross-sectional throat region directly downstream of the entrance thereof, and a relatively increased cross-sectional diffuser region downstream from the throat, the improvement for enhancing unsaturated hydrocarbon production while reducing power requirements which comprises:
   (1) feeding a reactant gas consisting essentially of at least one hydrocarbon having one to eight carbon atoms selected from the group consisting of saturated and unsaturated hydrocarbons into said passages of said electrode elements through the entrances thereof, said reactant gas being fed through said passages at a pressure greater than atmospheric;
   (2) establishing an arc at least substantially within said passages and having an energy content, basis 100 cu. ft. (N.T.P.) of said reactant gas per hour, within the range of 9–13 kw.; and
   (3) bleeding at substantially ambient temperature a nonoxidizing diluent gas for passage along at least a portion of said throat in a direction towards the exit of the electrode passage and in an amount sufficient to provide a volume ratio of inert gas to reactant hydrocarbons, basis total gaseous feed to said throat, of below about 3:1, whereby said diluent gas flows downstream from the reactant gas feeding into the throat entrance, and substantially along the walls of said throat, forming a sheath of diluent gas around the balance of said gas in the throat.

2. The process of claim 1 wherein diluent gas is first fed into said passages of the electrode elements to the entrances thereof, said arc is then established, and thereafter said reactant gas is blended with diluent gas and the blend is fed into the electrode element passages through the entrances thereof.

3. The process of claim 1 wherein said diluent gas is selected from the group consisting of hydrogen, nitrogen, argon, helium, recycle gas, and mixtures thereof, and the volume ratio of diluent gas to reactant hydrocarbons is below about 1.5:1.

4. The process of claim 1 wherein the product gas includes acetylene.

References Cited

UNITED STATES PATENTS

| 3,051,639 | 8/1962 | Anderson | 204—171 |
| 3,077,108 | 2/1963 | Gage et al. | 73—147 |
| 3,113,919 | 12/1963 | Hanganutiu | 204—327 |
| 3,377,402 | 4/1968 | Sennewald et al. | 260—679 |
| 3,393,249 | 7/1968 | Fox et al. | 260—671 |
| 3,400,070 | 9/1968 | Naff | 204—311 |

ROBERT K. MIHALEK, Primary Examiner

U.S. Cl. X.R.

204—170, 311, 323